(12) United States Patent
Wen et al.

(10) Patent No.: US 10,330,959 B2
(45) Date of Patent: Jun. 25, 2019

(54) POLARIZATION INSENSITIVE MICRO RING MODULATOR

(71) Applicant: Futurewei Technologies, Inc., Plano, TX (US)

(72) Inventors: Yangjing Wen, Cupertino, CA (US); Yu Sheng Bai, Los Altos Hills, CA (US); Hongzhen Wei, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/601,706

(22) Filed: May 22, 2017

(65) Prior Publication Data

US 2018/0335652 A1 Nov. 22, 2018

(51) Int. Cl.
*G02F 1/01* (2006.01)
*G02B 6/293* (2006.01)

(52) U.S. Cl.
CPC .......... *G02F 1/011* (2013.01); *G02B 6/29335* (2013.01); *G02F 1/0123* (2013.01); *G02F 1/0147* (2013.01); *G02F 2203/01* (2013.01); *G02F 2203/06* (2013.01); *G02F 2203/15* (2013.01)

(58) Field of Classification Search
CPC ............ G02B 6/29338; G02B 6/29341; G02B 6/29335; G02B 6/2934; G02F 1/01; G02F 1/011
USPC ....................................... 385/1–3, 14, 32, 58
See application file for complete search history.

(56) References Cited

U.S. PATENT DOCUMENTS

| 5,069,520 | A | | 12/1991 | Calvani et al. |
| 5,307,197 | A | * | 4/1994 | Tanabe .................. G02B 6/126 398/205 |
| 5,654,818 | A | * | 8/1997 | Yao ........................ G02F 1/035 359/246 |
| 6,400,856 | B1 | | 6/2002 | Chin |

(Continued)

FOREIGN PATENT DOCUMENTS

| CN | 1369153 A | 9/2002 |
| CN | 1900768 A | 1/2007 |

(Continued)

OTHER PUBLICATIONS

"A tunable polarization diversity silicon photonics filter" by Zhang et al, Optics Letters, vol. 19, No. 14, pp. 13063-13072, 2011.*

(Continued)

*Primary Examiner* — Robert Tavlykaev
(74) *Attorney, Agent, or Firm* — Conley Rose, P.C.

(57) ABSTRACT

A transmission-type polarization insensitive modulator implemented as a polarization insensitive micro ring modulator (PIMRM) includes a first polarization splitter-rotator (PSR) configured to generate a first light beam and a second light beam having a common polarization from an input, a micro ring configured to modulate the first light beam with data to generate a first output signal, and modulate the second light beam with data to generate a second output signal, and a second PSR configured to combine the first output signal and the second output signal to form a modulated output signal, wherein the micro ring is disposed in between the first PSR and the second PSR.

20 Claims, 9 Drawing Sheets

(56) References Cited

U.S. PATENT DOCUMENTS

| | | |
|---|---|---|
| 6,519,060 B1 | 2/2003 | Liu |
| 6,580,851 B1 | 6/2003 | Vahala et al. |
| 6,656,584 B1 | 12/2003 | Sugimoto et al. |
| 6,751,002 B2 | 6/2004 | Ovadia et al. |
| 7,065,272 B2 | 6/2006 | Taillaert et al. |
| 7,251,076 B1 | 7/2007 | Okada et al. |
| 7,327,911 B2* | 2/2008 | Piede ............... G02F 1/025 385/129 |
| 7,428,358 B2 | 9/2008 | Lu et al. |
| 8,131,156 B2 | 3/2012 | Yu |
| 8,923,660 B2 | 12/2014 | Dorin et al. |
| 8,988,753 B2 | 3/2015 | Schwedt et al. |
| 9,203,517 B2 | 12/2015 | Zhou et al. |
| 9,235,100 B1 | 1/2016 | Kaplan |
| 9,647,426 B1 | 5/2017 | Fish et al. |
| 9,831,944 B2 | 11/2017 | Izumi |
| 9,979,472 B1 | 5/2018 | Wang et al. |
| 2001/0004290 A1 | 6/2001 | Lee et al. |
| 2002/0041562 A1 | 4/2002 | Redmond et al. |
| 2002/0051600 A1 | 5/2002 | Hung |
| 2003/0118280 A1 | 6/2003 | Miyazaki et al. |
| 2003/0235370 A1 | 12/2003 | Taillaert et al. |
| 2004/0005056 A1 | 1/2004 | Nishioka et al. |
| 2004/0190107 A1 | 9/2004 | Hiironen et al. |
| 2004/0247227 A1* | 12/2004 | Eder ............... G02B 6/12007 385/11 |
| 2005/0047727 A1 | 3/2005 | Shin et al. |
| 2005/0088724 A1 | 4/2005 | Lee et al. |
| 2005/0163503 A1 | 7/2005 | Lee et al. |
| 2006/0093360 A1 | 5/2006 | Kim et al. |
| 2006/0266744 A1 | 11/2006 | Nomaru |
| 2007/0121189 A1 | 5/2007 | Zami et al. |
| 2007/0230882 A1 | 10/2007 | Hainberger |
| 2008/0019693 A1 | 1/2008 | Sorin |
| 2009/0060525 A1 | 3/2009 | Von Lerber |
| 2009/0220230 A1 | 9/2009 | Kim et al. |
| 2010/0002881 A1 | 1/2010 | Youn et al. |
| 2010/0006784 A1 | 1/2010 | Mack et al. |
| 2010/0119229 A1 | 5/2010 | Roelkens et al. |
| 2010/0254719 A1 | 10/2010 | Zhang et al. |
| 2010/0303469 A1 | 12/2010 | Barton et al. |
| 2011/0122470 A1 | 5/2011 | Berrettini et al. |
| 2011/0142395 A1 | 6/2011 | Fortusini et al. |
| 2011/0273657 A1 | 11/2011 | Collings et al. |
| 2012/0014697 A1 | 1/2012 | Zhao et al. |
| 2012/0106963 A1 | 5/2012 | Huang et al. |
| 2012/0301068 A1 | 11/2012 | Meade et al. |
| 2013/0058652 A1 | 3/2013 | Charbonnier et al. |
| 2013/0129361 A1 | 5/2013 | Hsiao |
| 2014/0099057 A1 | 4/2014 | Sun et al. |
| 2014/0153862 A1 | 6/2014 | Picard et al. |
| 2014/0193152 A1 | 7/2014 | Zhou et al. |
| 2014/0341579 A1 | 11/2014 | Effenberger et al. |
| 2014/0348450 A1 | 11/2014 | Kachoosangi |
| 2014/0348460 A1 | 11/2014 | Dorin et al. |
| 2015/0063741 A1 | 3/2015 | Menezo et al. |
| 2015/0063807 A1 | 3/2015 | Simonneau et al. |
| 2015/0277207 A1* | 10/2015 | Fujikata ............... G02F 1/225 385/3 |
| 2015/0316722 A1 | 11/2015 | Miao et al. |
| 2015/0338577 A1 | 11/2015 | Shi et al. |
| 2016/0007105 A1 | 1/2016 | Jeong et al. |
| 2016/0246005 A1 | 8/2016 | Liu et al. |
| 2016/0261352 A1 | 9/2016 | Wen et al. |
| 2016/0315699 A1 | 10/2016 | Izumi |
| 2016/0337041 A1 | 11/2016 | Wen et al. |
| 2017/0059887 A1 | 3/2017 | Park et al. |
| 2017/0155451 A1 | 6/2017 | Hayakawa |
| 2017/0346592 A1 | 11/2017 | Liu et al. |
| 2018/0143460 A1 | 5/2018 | Wen et al. |

FOREIGN PATENT DOCUMENTS

| | | |
|---|---|---|
| CN | 100410733 C | 8/2008 |
| CN | 102143407 A | 8/2011 |
| CN | 102282509 A | 12/2011 |
| CN | 102820945 A | 12/2012 |
| CN | 103412367 A | 11/2013 |
| CN | 103424894 A | 12/2013 |
| CN | 104049375 A | 9/2014 |
| CN | 104122674 A | 10/2014 |
| CN | 104238023 A | 12/2014 |
| CN | 104297947 A | 1/2015 |
| CN | 102820945 B | 9/2015 |
| CN | 105223647 A | 1/2016 |
| CN | 104049375 B | 2/2016 |
| JP | H11167090 A | 6/1999 |
| JP | 2012203334 A | 10/2012 |
| JP | 2013530613 A | 7/2013 |
| TW | 476012 B | 2/2002 |
| WO | 0076103 A1 | 12/2000 |
| WO | 2014209294 A1 | 12/2014 |

OTHER PUBLICATIONS

"Silicon photonic circuit with polarization diversity" by Fukuda et al, Optics Letters, vol. 16, No. 7, pp. 4872-4880, 2008.*

Wen, et al., "Polarization Insensitive Integrated Optical Modulator," U.S. Appl. No. 15/417,569 filed Jan. 27, 2017, 25 pages.

Partial English Translation and Abstract of Chinese Patent Application No. CN102820945, Sep. 21, 2016, 4 pages.

Partial English Translation and Abstract of Chinese Patent Application No. CN104049375, Sep. 21, 2016, 6 pages.

Partial English Translation and Abstract of Chinese Patent Application No. CN104122674, Sep. 21, 2016, 6 pages.

Dai, D., et al., "Novel Concept for Ultracompact Polarization Splitter-Rotator based on Silicon Nanowires," Optics Express, vol. 19, No. 11, May 23, 2011, pp. 10940-10949.

Rajesh, K., "Data Center Network—Top of Rack (TOR) vs End of Row (EOR) Design," Feb. 9, 2012, 4 pages.

Smith, D., et al., "Colourless 10Gb/s Reflective SOA-EAM with Low Polarization Sensitivity for Long-reach DWDM-PON Networks," ECOC 2009, VDE VERLAG GMBH, Sep. 2009, 2 pages.

Menezo, S., et al., "Reflective Silicon Mach Zehnder Modulator With Faraday Rotator Mirror effect for self-coherent transmission," OFC/NFOEC Technical Digest Optical Society of America, 2013, 3 pgs.

Foreign Communication From a Counterpart Application, PCT Application No. PCT/CN2016/080513, English Translation of International Search Report dated Aug. 1, 2016, 8 pages.

Foreign Communication From a Counterpart Application, PCT Application No. PCT/CN2016/080513, English Translation of Written Opinion dated Aug. 1, 2016, 4 pages.

Office Action dated Sep. 8, 2017, 29 pages, U.S. Appl. No. 15/136,396, filed Apr. 22, 2016.

Ng, T., et al., "Sagnac-loop phase shifter with polarization-independent operation," Review of Scientific Instruments 82, 013106, 2011, 4 pages.

Chen, S., et al., "Full-duplex bidirectional data transmission link using twisted lights multiplexing over 1.1-km orbital angular momentum fiber," Scientific Reports, Nov. 30, 2016, 7 pages.

Liu, J., "Demonstration of polarization-insensitive spatial light modulation using a single polarization-sensitive spatial light modulator," Scientific Reports, 2015, Jul. 6, 7 pages.

Shieh, W., et al., "Theoretical and experimental study on PMD-supported transmission using polarization diversity in coherent optical OFDM systems," Optics Express, vol. 15, No. 16, Aug. 6, 2007, 12 pages.

Ding Y., et al., "Polarization diversity DPSK demodulator on the silicon-on-insulator platform with simple fabrication," Optics Express, vol. 21, No. 6, 2013, 8 pages.

Zou, "An SOI Based Polarization Insensitive Filter for All-optical Clock Recovery," Optics Express, vol. 22, No. 6, Mar. 2014, pp. 6647-6652.

(56) References Cited

OTHER PUBLICATIONS

Luo, et al., "Time- and Wavelength-Division Multiplexed Passive Optical Network (TWDM-PON) for Next-Generation PON Stage 2 (NG-PON2)," in Journal of Lightwave Technology, vol. 31, No. 4, Feb. 15, 2013, pp. 587-593.
Watts, M., et al., "Low-Voltage, Compact, Depletion-Mode, Silicon Mach-Zehnder Modulator," IEEE Journal of Selected Topics in Quantum Electronics, vol. 16, No. 1, Jan./Feb. 2010, pp. 159-164.
Patel, D., et al., "A Lumped Michelson Interferometric Modulator in Silicon," CLEO, Optical Society of America, 2014, 2 pages.
Foreign Communication From a Counterpart Application, PCT Application No. PCT/CN2017/110881, English Translation of International Search Report dated Jan. 31, 2018, 7 pages.
Foreign Communication From a Counterpart Application, PCT Application No. PCT/CN2017/110881, English Translation of Written Opinion dated Jan. 31, 2018, 4 pages.
Office Action dated Feb. 6, 2018, 29 pages, U.S. Appl. No. 15/136,396, filed Apr. 22, 2016.
Office Action dated Feb. 13, 2017, 21 pages, U.S. Appl. No. 15/357,199, filed Nov. 21, 2016.
Office Action dated Aug. 11, 2017, 33 pages, U.S. Appl. No. 15/357,199, filed Nov. 21, 2016.
Office Action dated Dec. 15, 2017, 16 pages, U.S. Appl. No. 15/357,199, filed Nov. 21, 2016.
Machine Translation and Abstract of Japanese Publication No. JPH11167090, Jun. 22, 1999, 9 pages.
Foreign Communication From a Counterpart Application, PCT Application No. PCT/CN2018/073645, English Translation of International Search Report dated Apr. 23, 2018, 6 pages.
Foreign Communication From a Counterpart Application, PCT Application No. PCT/CN2018/073645, English Translation of Written Opinion dated Apr. 23, 2018, 5 pages.
Machine Translation and Abstract of Chinese Publication No. CN102143407, Aug. 3, 2011, 24 pages.
Machine Translation and Abstract of Chinese Publication No. CN105223647, Jan. 6, 2016, 35 pages.
Machine Translation and Abstract of Chinese Publication No. CN103412367, Nov. 27, 2013, 13 pages.
Machine Translation and Abstract of Chinese Publication No. CN104238023, Dec. 24, 2014, 12 pages.
Dai, D., et al., "Passive technologies for future large-scale photonic integrated circuits on silicon: polarization handling, light non-reciprocity and loss reduction," Light: Science & Applications, 2012, 12 pages.
Foreign Communication From a Counterpart Application, PCT Application No. PCT/CN2018/087982, English Translation of International Search Report dated Aug. 14, 2018, 4 pages.
Foreign Communication From a Counterpart Application, PCT Application No. PCT/CN2018/087733, English Translation of International Search Report dated Sep. 5, 2018, 6 pages.
Foreign Communication From a Counterpart Application, PCT Application No. PCT/CN2018/087733, English Translation of Written Opinion dated Sep. 5, 2018, 4 pages.
Office Action dated Sep. 7, 2018, 83 pages, U.S. Appl. No. 15/602,909, filed May 23, 2017.
Office Action dated Jun. 14, 2018, 18 pages, U.S. Appl. No. 15/357,199, filed Nov. 21, 2016.
Fukuda, H., et al., "Polarization Beam Splitter and Rotator for Polarization-Independent Silicon Photonic Circuit," IEEE, 2007, pp. 4-6.
Foreign Communication From a Counterpart Application, European Application No. 17871334.3, Extended European Search Report dated Dec. 20, 2018, 6 pages.
Office Action dated Jan. 14, 2019, 28 pages, U.S. Appl. No. 15/357,199, filed Nov. 21, 2016.
Machine Translation and Abstract of Japanese Publication No. JP2012203334, Oct. 22, 2012, 11 pages.
Yao, S., "Polarization Insensitive Antenna Remoting Link with Frequency Conversion Gain," IEEE Photonics Technology Letters, vol. 12, No. 10, Oct. 2000, pp. 1382-1384.
Charbonnier, B., et al., "Silicon Photonics for Next Generation FDM/FDMA PON," J. Opt. Commun. Netw., vol. 4, No. 9, Sep. 2012, pp. A29-A37.
Esman, R.D., et al., "Polarization-Independent Fiber-Optic Microwave Modulator," Summer Tropical Meeting Digest on Optical Microvave Interactions, Jul. 19, 1993, pp. 31-32.
Foreign Communication From a Counterpart Application, Japanese Application No. 2017-559501, Japanese Office Action dated Oct. 2, 2018, 8 pages.
Foreign Communication From a Counterpart Application, Japanese Application No. 2017-559501, English Translation of Japanese Office Action dated Oct. 2, 2018, 10 pages.
Office Action dated Jun. 22, 2018, 29 pages, U.S. Appl. No. 15/417,569, filed Jan. 27, 2017.

\* cited by examiner

POLARIZATION INSENSITIVE MICRO RING MODULATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical access networks, carrier distribution has been considered as a promising scheme in realizing a low-cost light source for uplink signal. In carrier distribution schemes, an optical carrier signal is delivered from an optical source positioning in a central office to a remote device. The remote device then modulates uplink data onto the received optical carrier signal, and sends the modulated carrier signal back to the central office. However, current modulators employed in such systems depend on a polarization of the incoming light, consume an unnecessary amount of power, and have a large footprint.

SUMMARY

In one embodiment, the disclosure apparatus implemented as a transmission-type polarization insensitive modulator, comprising an input configured to receive a continuous wave (CW) light, a first polarization splitter-rotator (PSR) operably coupled to the input and configured to generate a first light beam and a second light beam having a common polarization from the input, an upper waveguide bus coupled to the first PSR, a lower waveguide bus coupled to the first PSR, a micro ring optically coupled to the upper waveguide bus and the lower waveguide bus and configured to modulate the first light beam with data to generate a first output signal, and modulate the second light beam with data to generate a second output signal, a second PSR operably coupled to the upper waveguide bus and the lower waveguide bus and configured to combine the first output signal and the second output signal to form a modulated output signal, and an output operably coupled to the second PSR and configured to output the modulated output signal to an optical receiving device, wherein the output is separate from the input. In some embodiments, the first PSR is further configured to split the CW light into the first light beam having a transverse electric (TE) polarization and a third light beam having a transverse magnetic (TM) polarization, and rotate the third light beam having the TM polarization to generate the second light beam having the TE polarization. In some embodiments, the micro ring is further configured to modulate the first light beam to generate a drop signal and a pass signal, and pass the drop signal around the micro ring and to the lower waveguide bus, wherein the pass signal is the first output signal. In some embodiments, the micro ring is further configured to modulate the second light beam to generate a drop signal and a pass signal, and transmit the drop signal around the micro ring to the upper waveguide bus, wherein the pass signal is the second output signal. In some embodiments, an amplitude transfer function of the first drop signal or the second drop signal is defined by the equation $$H_{drop} = \frac{E_{drop}}{E_{input}} = -\frac{k^2 \sqrt{a}\, e^{j\phi/2}}{1 - t^2 a e^{j\phi}},$$

an amplitude transfer function of the first pass signal and the second pass signal is defined by the equation $$H_{pass} = \frac{E_{pass}}{E_{input}} = \frac{t - t a e^{j\phi}}{1 - t^2 a e^{j\phi}},$$

wherein $E_{drop}$ is an optical field for the first drop signal or the second drop signal, $E_{pass}$ is the optical field for the first pass signal or the second pass signal, e is a natural exponential function, $\phi$ is a single-pass phase shift, k is a cross-coupling coefficient, t is a self-coupling coefficient, a is a single pass amplitude transmission, and j is a unit imaginary number where $j^2$ equals 1. In some embodiments, the apparatus further comprises a heater coupled to the micro ring, a first tap disposed on the upper waveguide bus and configured to couple out a first portion of the first output signal to send to a monitor photodetector, a second tap disposed on the lower waveguide bus and configured a second portion of the second output signal to send to the monitor photodetector, wherein the monitor photodetector is configured to generate a combined photodetector current based on the first portion of the first output signal and the second portion of the second output signal, and a processor coupled to the monitor photodetector and configured to generate a bias current based on the combined photodetector current, and apply the bias current to the heater such that the temperature of the heater is changed according to the bias current, wherein the temperature of micro ring changes according to the temperature of the heater. In some embodiments, the output is transmitted along a fiber to an uplink receiver in a baseband unit (BBU), wherein the apparatus is a polarization insensitive micro ring modulator (PIMRM) disposed in a remote radio unit (RRU).

In an embodiment, the disclosure includes a transmission-type modulator having an input separate from an output, comprising a first PSR configured to generate a first light beam and a second light beam having a common polarization from an input, a micro ring configured to modulate the first light beam with data to generate a first output signal, and modulate the second light beam with data to generate a second output signal, a second PSR operably coupled to the upper waveguide bus and the lower waveguide bus and configured to combine the first output signal and the second output signal to form a modulated output signal, wherein the micro ring is disposed in between the first PSR and the second PSR, and an output operably coupled to the second PSR and configured to output the modulated output signal to an optical receiving device, wherein the output is separate from the input. In some embodiments, the transmission-type modulator further comprises an upper waveguide bus and a lower waveguide bus, wherein a top portion of the micro ring is optically coupled to the upper waveguide bus, and wherein a bottom portion of the micro ring is optically coupled to the lower waveguide bus. In some embodiments, the first light beam is modulated such that a first modulated drop signal and a first modulated pass signal is generated, wherein the first modulated drop signal passes through the micro ring and back to the first PSR, wherein the first modulated pass signal is the first output signal, wherein the second light beam is modulated such that a second modulated drop signal and a second modulated pass signal is generated, wherein the second modulated drop signal passes through the micro ring and back to the first PSR, and wherein the second modulated pass signal is the second output signal. In some embodiments, the transmission-type modulator is disposed in a RRU, and wherein the output is transmitted to a multiplexer in the RRU such that the multiplexer transmits a multiplexed signal comprising the output to a BBU. In some embodiments, the transmission-type modulator further comprises comprising a processor coupled to a heater and configured to apply a bias current to the heater, wherein the heater is coupled to the micro ring, wherein the bias current is determined based on a photodetector current of the first output signal and the second output signal.

In an embodiment, the disclosure includes a method of modulation implemented by a PIMRM, comprising receiving, at an input of the PIMRM, a CW light, generating, by a first PSR of the PIMRM, a first light beam and a second light beam having a common polarization from the input, modulating, using a micro ring of the PIMRM, the first light beam with data to generate a first output signal and the second light beam with data to generate a second output signal, combining, by a second PSR of the PIMRM, the first output signal and the second output signal to form a modulated output signal, and transmitting, at an output of the PIMRM that is separate from the input, the modulated output signal to an optical receiving device. In some embodiments, generating, by the first PSR, the first light beam and the second light beam having the common polarization comprises splitting, by the first PSR, the CW light into the first light beam having a TE polarization and a third light beam having a TM polarization, and rotating, by the first PSR, the third light beam having the TM polarization to generate the second light beam having the TE polarization. In some embodiments, the method further comprises providing, by the first PSR, the first light beam to an upper waveguide bus of the PIMRM, and providing, by the first PSR, the second light beam to a lower waveguide bus of the PIMRM, wherein the micro ring is disposed in between the upper waveguide bus and the lower waveguide bus, and wherein the micro ring is optically coupled to the upper waveguide bus, and wherein the micro ring is optically coupled to the lower waveguide bus, wherein the micro ring is disposed in between the first PSR and the second PSR. In some embodiments, modulating, using the micro ring, the first light beam with data to generate the first output signal comprises modulating, using the micro ring, the first light beam to generate a first drop signal and a first pass signal, wherein the first drop signal travels around the micro ring and passes to the lower waveguide bus such that the first drop signal is reflected back to the first PSR, and wherein the first pass signal is the first output signal. In some embodiments, modulating, using the micro ring, the second light beam with data to generate the second output signal, comprises modulating, using the micro ring, the second light beam to generate a second drop signal and a second pass signal, wherein the second drop signal travels around the micro ring and passes to the upper waveguide bus such that the second drop signal is reflected back to the first PSR, and wherein the second pass signal is the second output signal. In some embodiments, the method further comprises controlling, by a processor operably coupled to the micro ring via a heater, a bias current of the heater, wherein controlling the bias current controls a temperature of the micro ring.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
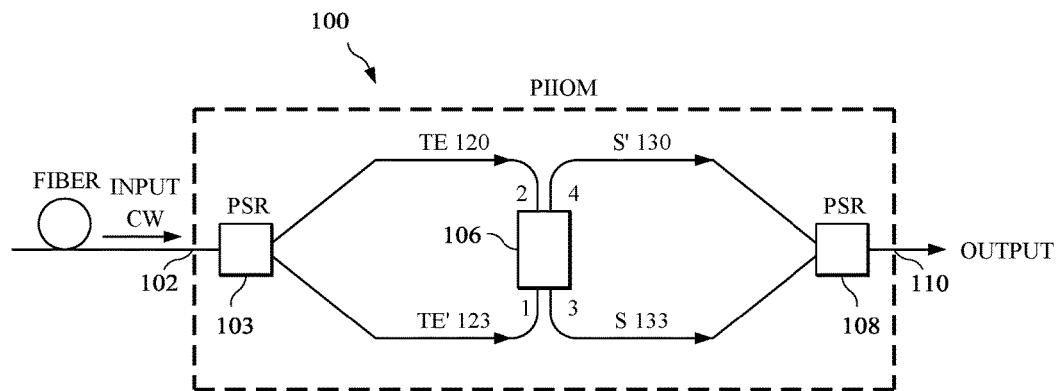
FIG. 1 is a schematic diagram of an embodiment of previously proposed polarization insensitive integrated optical modulator (PIIOM).

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For short reach optical networks, such as a data center, a cloud radio access network (CRAN), or a WDM passive optical network, remote modulation schemes are implemented using a centralized light source and external modulators, such as silicon modulators. The external modulators are coupled to the centralized light source using a single-mode fiber cable. The external modulators can only function properly if the polarization of the light beam received from the centralized light source and the modulator itself are aligned. However, polarization of the light beam varies randomly after fiber transmission in remote modulation scenarios, thereby making it difficult to implement remote modulation without the use of a costly polarization maintaining fiber.

Optical modulators of the prior art often have a problem of dependence on a polarization orientation of an incoming optical light. The embodiments disclosed herein solve the problem of the prior art by enabling polarization insensitive modulation of light beam, such as performed by a PIMRM, as discussed in greater detail below.

Disclosed herein are various embodiments that provide for polarization independent modulation of multiple wavelengths of a CW light using a PIMRM. The PIMRM eliminates the polarization dependence of an optical carrier coming from an optical medium such as a fiber. The PIMRM employs a first PSR to split the incoming optical carrier into two perpendicular polarization components, sometimes referred to herein as TE and TM components, and forwards each of the polarization components along a different light path. One of the polarization components is then rotated to be parallel to the other component. For example, the TM component is rotated, resulting in a second TE component. After rotation, both polarization components share the same polarization and are input into an optical modulator, such as a micro ring, from opposite ends for substantially simultaneous modulation. The modulated components then return to a second PSR for combination into a complete modulated signal. Multiple PIMRMs may be coupled to a multiplexer to allow each PIMRM to operate on a different wavelength ($\lambda$), allowing the PIMRMs to support wavelength division multiplexing. In a CRAN network, the PIMRM(s) are positioned in one or more remote radio units (RRUs), each corresponding to a BBU comprising the optical source (e.g. laser). In a datacenter network, the PIMRMs may be positioned in server rack, for example in the servers or in a top of rack (ToR) element. PIMRMs may also be positioned in end of row (EOR) switches, which allows a single optical source/laser to provide carriers for a plurality of sever rows. The use of the two PSRs enables the PIMRM to be insensitive to the polarization of the input light. The use of the micro ring as the modulator consumes a lower amount of power, enables a higher transmission bandwidth, and has a lower footprint than the traditional external modulator.

FIG. 1 is a schematic diagram of an embodiment of a previously proposed polarization insensitive integrated optical modulator (PIIOM) 100, as provided in U.S. patent application Ser. No. 15/417,569, filed on Jan. 27, 2017, which is hereby incorporated by reference in its entirety. The PIIOM 100 includes an input 102, a first PSR 103, a multiport modulator 106, a second PSR 108, and an output 110. The input 102 is configured to receive a CW light, which is labeled Input CW in FIG. 1. The CW light is transmitted to the input 102 by way of an optical fiber. The CW light received at the input 102 is provided to the first PSR 103. The PSR 103 splits the CW light into a first light beam having a TE polarization, which is labeled TE 120 in FIG. 1, and a third light beam having a TM polarization. The PSR 103 rotates the third light beam having the TM polarization to generate a second light beam having the TE polarization, which is labeled TE' 123 in FIG. 1. As oriented in FIG. 1, the first light beam TE 120 is output from a top of the first PSR 103 and the second light beam TE' 123 is output from a bottom of the first PSR 103.

After exiting the first PSR 103, the first light beam TE 120 and the second light beam TE' 123 are provided to the multiport modulator 106, which may be a four port modulator (FPM). In an embodiment, the multiport modulator 106 is a four-port modulator. The first light beam TE 120 enters port 2 of the multiport modulator 106, which is labeled with a 2, and the second light beam TE' 123 enters port 1 of the multiport modulator 106, which is labeled with a 1. As shown, the first light beam TE 120 and second light beam TE' 123 enter the multiport modulator 106 from opposite directions (e.g., from the top and the bottom as oriented in FIG. 1).

The multiport modulator 106 modulates the first light beam TE 120 with data to generate a first output signal, which is labeled S 133 in FIG. 1, and modulates the second light beam TE' 123 with data to generate a second output signal, which is labeled S' 130 in FIG. 1. As oriented in FIG. 1, the first output signal S 133 exits from port 3, which is labeled with a 3, of the multiport modulator 106 and the second output signal S' 130 exits from port 4, which is labeled with a 4, of the multiport modulator 106. As shown, the first output signal S 133 and second output signal S' 130 exit the multiport modulator 106 from opposite directions (e.g., from the bottom and the top as oriented in FIG. 1).

The second PSR 108 receives the first output signal S 133 and the second output signal S' 130 from the modulator 106. The second PSR 108 combines the first output signal S 133 and the second output signal S' 130 to generate a modulated output signal, which is labeled output 110 in FIG. 1. The modulated output 110 is output from the PIIOM 100 onto an optical fiber and to, for example, a device configured to receive a modulated optical signal (e.g., an optical receiver). Because the output 110 for the modulated output signal is separate from the input 102 for the CW light, the PIIOM 100 is referred to as a transmission-type modulator.

The PIIOM 100 eliminates the polarization dependence of an incoming optical carrier wave and makes external modulation a reality. However, the PIIOM 100's multiport modulator 106 is typically a four-port Mach-Zehnder modulator (MZM) or a four-port in-phase quadrature modulator (IQM) including an in-phase (I) modulator and a quadrature (Q) modulator. Therefore, the PIIOM 100's multiport modulator 106 typically consumes a large amount of power and has a high footprint.

Disclosed herein are various embodiments that provide for a polarization independent modulation of multiple wavelengths of a CW light using a PIMRM. The embodiments of the PIMRM disclosed herein use a micro ring instead of a MZM or an IQM. The use of the micro ring instead of the MZM or IQM results in the PIMRM having a reduced footprint, higher bandwidth capability, and lower power consumption.

Figure 2:
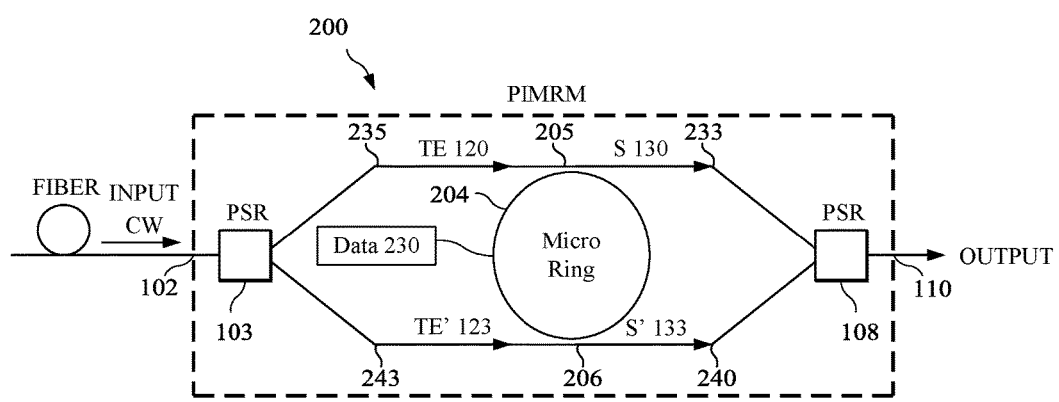
FIG. 2 is a schematic diagram of an embodiment of a PIMRM.

FIG. 2 is a schematic diagram of an embodiment of a PIMRM 200. PIMRM 200 is similar to PIIOM 100, except that PIMRM 200 uses a micro ring 204 as a modulator. PIMRM 200 includes an input 102, a first PSR 103, a micro ring 204, an upper waveguide bus 205, a lower waveguide bus 206, a second PSR 108, and an output 110. The micro ring 204 may be a waveguide comprising, for example, a silicon core and a silica cladding. The upper waveguide bus 205 and the lower waveguide bus 206 are also waveguides comprising, for example, a silicon core and a silica cladding.

The micro ring 204 is optically coupled to the upper waveguide bus 205 and optically coupled to the lower waveguide bus 206 in a symmetrical manner, as shown in FIG. 2. The micro ring 204 is optically coupled to the upper waveguide bus 205 and the lower waveguide bus 206 in a manner in which the micro ring 204 does not have to necessarily be physically touching either the upper waveguide bus 205 and/or the lower waveguide bus 206. The upper waveguide bus 205 and the lower waveguide bus 206 are positioned within a certain proximity to the edges of the micro ring 204 such that a portion of light passing through the upper waveguide bus 205 and the lower waveguide bus 206 is passed to the micro ring 204. Here the upper waveguide bus 205 and the lower waveguide bus 206 are passive waveguides, while the micro ring 204 is active waveguide with pn junctions built in the ring to realize optical modulation with applied electrical data.

The micro ring 204 may be positioned substantially in the center of the PIMRM 200, in between the upper waveguide bus 205 and the lower waveguide bus 206. The micro ring 204 may also be positioned in the middle between the first PSR 103 and the second PSR 108. The first PSR 103, micro ring 204, upper waveguide bus 205, lower waveguide bus 206, and second PSR 108 may be structured based on waveguide optics with a silicon photonics platform. The upper waveguide bus 205, lower waveguide bus 206, and micro ring 204 together form an add-drop micro ring resonator, where the micro ring 204 is active waveguide with pn junctions built in the ring to realize optical modulation with applied electrical data.

The input 102 is configured to receive a CW light, which is labeled Input CW in FIG. 2. The CW light is transmitted to the input 102 by way of an optical fiber. The CW light received at the input 102 is provided to the first PSR 103. The first PSR 103 splits the CW light into a first light beam TE 120 having a TE polarization and a third light beam having a TM polarization. The first PSR 103 also rotates the third light beam having the TM polarization to generate a second light beam TE' 123 having the TE polarization. As oriented in FIG. 2, the first light beam TE 120 is output from a top of the first PSR 103 and the second light beam TE' 123 is output from a bottom of the first PSR 103.

After exiting the first PSR 103, the first light beam TE 120 is provided to the upper waveguide bus 205 and the second light beam TE' 123 is provided to the lower waveguide bus 206. In an embodiment, the micro ring 204 acts as the modulator that is configured to modulate the first light beam TE 120 and the second light beam TE' 123 to output some data. In an embodiment, the first light beam TE 120 in the upper waveguide bus 205 is coupled with the micro ring 204 such that the first light beam TE 120 is modulated by electrical data 230. Similarly, the second light beam TE' 123 in the lower waveguide bus 206 is also coupled with the micro ring 204 such that the second light beam TE' 123 is also modulated by the same electrical data 230. Micro ring 204 modulates the first light beam TE 120 to generate two separate signals, a pass signal and a dropped signal (also referred to herein as a modulated pass signal and modulated drop signal).

A first part of the first light beam TE 120 that passes through the upper waveguide bus 205 after passing by the micro ring 204 becomes the first pass signal, which is labeled S 130 in FIG. 2. The first pass signal S 130 is the modulated signal sent to the second PSR 108. For example, the first light beam TE 120 is modulated with electrical data 230 using the micro ring 204 to generate the first pass signal S 130. In an embodiment, the first pass signal S 130 is sent to the second PSR 108 via a first pass port 233, which is a second portion of the upper waveguide bus 205. A second part of the first light beam TE 120 that passes through the micro ring 204 becomes the first drop signal. The first drop signal is then dropped from the micro ring 204 to the lower waveguide bus 206 and then sent back to the first PSR 103. In an embodiment, the first drop signal is sent back to the first PSR 103 via a second drop port 243, which is a first portion of the lower waveguide bus 206. Similarly, a first part of the second light beam TE' 123 that passes through the lower waveguide bus 206 after passing by the micro ring 204 becomes the second pass signal, which is labeled S'133 in FIG. 2. The second pass signal S' 133 is sent to the second PSR 108. A second part of the second light beam TE' 123 that passes through the micro ring 204 becomes the second drop signal. In an embodiment, the second pass signal S' 133 is sent to the second PSR 108 via a second pass port 240, which is a second portion of the lower waveguide bus 206. The second drop signal is then dropped from the micro ring 204 to the upper waveguide bus 205 and then sent back to the first PSR 103. In an embodiment, the second drop signal is sent back to the first PSR 103 via a first drop port 235, which is a first portion of the upper waveguide bus 205. As shown in FIG. 2, the first light beam TE 120 and the second light beam TE' 123 enter the micro ring 204 from opposite directions (e.g., from the top and the bottom as oriented in FIG. 2). The second PSR 108 receives the first pass signal S 130 and the second pass signal S' 133 and combines the first pass signal S 130 and the second pass signal S' 133 to form the output 110. In an embodiment, the PIMRM 200 also eliminates the polarization dependence of an incoming optical carrier wave. Therefore, the output 110 is independent of the polarization of the input 102.

Figure 3:
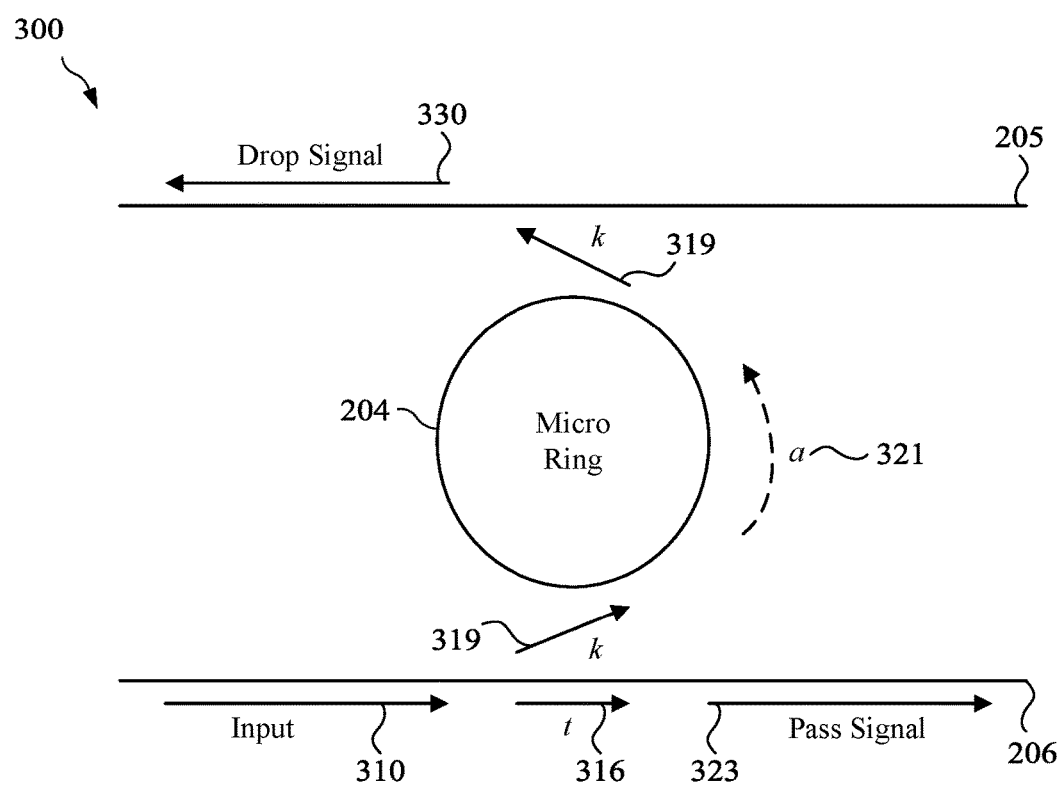
FIG. 3 is a schematic diagram of an embodiment of a portion of the PIMRM that forms a micro ring resonator.

FIG. 3 is a schematic diagram of an embodiment of a portion of the PIMRM 200 that forms four port modulator based on an add-drop micro ring resonator 300. The micro ring resonator 300 comprises a micro ring 204, an upper waveguide bus 205, and a lower waveguide bus 206. Similarly to PIMRM 200, the micro ring 204 is optically coupled to the upper waveguide bus 205 and optically coupled to the lower waveguide bus 206.

Similar to the embodiment described in FIG. 2, an input 310 is passed along the lower waveguide bus 206. The input 310 is similar to TE' 123. In the coupling region between micro ring 204 and lower waveguide bus 206, a first portion of the input 310 is provided to the micro ring 204 while a second portion of the input 310 is passed along the lower waveguide bus 206. The amount of the light from input 310 that passes as the first portion and the second portion are determined by two factors, the self-coupling coefficient 316, which is shown as t 316 in FIG. 3, and the cross-coupling coefficient 319, which is shown as k 319 in FIG. 3. The self-coupling coefficient, t 316, specifies the fraction of the amplitude transmitted on each pass of light through the lower waveguide bus 206. The cross-coupling coefficient, k 319, specifies the fraction of the amplitude transmitted on each pass of light through the micro ring 204. The power splitting ratios of the coupling between the lower waveguide bus 206 and the micro ring 204 is $t^2$ and $k^2$, which is defined by equation (1):

$$t^2+k^2=1 \qquad (1)$$

when there are no losses in the coupling section between the lower waveguide bus 206 and the micro ring 204.

The self-coupling coefficient t 316 and the cross-coupling coefficient k 319 relate to the single pass amplitude transmission, which is shown as a 321 in FIG. 3. The single pass amplitude transmission a 321 is related to the power attenuation coefficient ($\alpha$). The single pass amplitude transmission a 321 is defined by equation (2):

$$a^2=\exp(-\alpha L) \qquad (2)$$

where L is the round trip length of the micro ring 204.

The first portion of the input 310 is passed into the micro ring 204 based on the cross-coupling coefficient k 319 travels counter-clockwise around the micro ring 204 according to the single pass amplitude transmission a 321. For example, the light beam of the first portion of the input 310 follows along the waveguide of the micro ring 204 with other light that continuously circles along the micro ring 204, and is modulated by the micro ring 204. In the coupling region between micro ring 204 and upper waveguide bus, the first portion of the input 310 passes from the micro ring 204 to the upper waveguide bus 205 based on the cross-coupling coefficient k 319. The first portion of the input 310 that passes along the upper waveguide bus 205 in the left direction becomes the drop signal 330. The drop signal 330 is reflected back to a first PSR of the PIMRM, such as PSR 103 of PIMRM 200, and is thereby dropped. The drop signal 330 may be a signal that is not necessary to be transmitted to convey data. The amplitude transfer function of the drop signal 330 is defined by equation (3):

$$H_{drop} = \frac{E_{drop}}{E_{input}} = -\frac{k^2\sqrt{a}\,e^{j\phi/2}}{1-t^2 ae^{j\phi}} \qquad (3)$$

where $E_{drop}$ is the optical field for the drop signal 330, $E_{input}$ is the optical field for the input 310, e is natural exponential function, j is a unit imaginary number where $j^2$ equals 1, and $\phi$ is the single-pass phase shift, which is defined by equation (4):

$$\phi = \beta L \qquad (4)$$

where $\beta$ is the propagation constant of the circulating mode when light is circulating the micro ring 204. $\beta$ is related to the refractive index of the micro ring 204, which can be modulated by applying electrical data, such as data 130.

The second portion of the input 310 continues along the lower waveguide bus 206 based on the self-coupling coefficient t 316 and represents first part of the pass signal 323. In the coupling region between micro ring 204 and upper waveguide bus 205, the first portion of the input 310 continues along the micro ring 204 based on the self-coupling coefficient t, is modulated by the micro ring 204 and comes again to the coupling region between micro ring 204 and lower waveguide bus 206, passes from the micro ring 204 to the lower waveguide bus 205 based on the cross-coupling coefficient k to form another part of the pass signal 323. The amplitude transfer function of the pass signal 323 is defined by equation (5):

$$H_{pass} = \frac{E_{pass}}{E_{input}} = \frac{t - tae^{j\phi}}{1-t^2 ae^{j\phi}} \qquad (5)$$

where $E_{pass}$ is the optical field for the pass signal 323.

Figure 4:
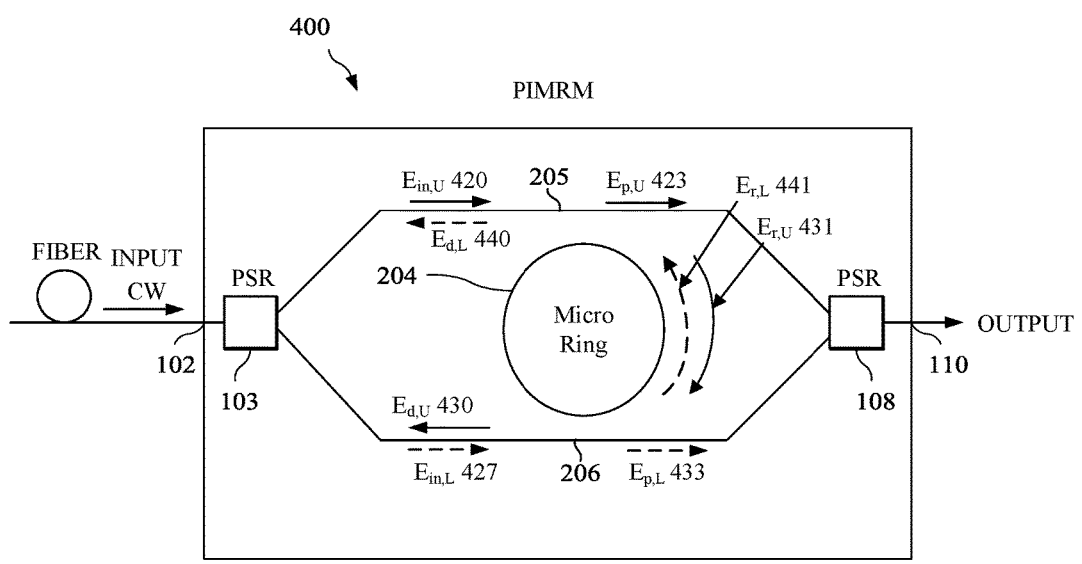
FIG. 4 is a schematic diagram illustrating light modulation using the PIMRM.

FIG. 4 is a schematic diagram illustrating light modulation using PIMRM 400. PIMRM 400 is similar to PIMRM 200 and includes a micro ring resonator similar to the micro ring resonator 300. PIMRM 400 includes an input 102, a first PSR 103, a micro ring 204, an upper waveguide bus 205, a lower waveguide bus 206, a second PSR 108, and an output 110. The input 102 is configured to receive CW light, which is labeled Input CW in FIG. 4. The CW light is transmitted to the input 102 by way of an optical fiber. The CW light received at the input 102 is provided to the first PSR 103. The first PSR 103 splits the CW light into two light beams and rotates one of the split light beams to generate two separate light beams having the same polarization. In this way, the PIMRM is configured to split the light beams into two light beams having the same polarization, modulate the light beams, and recombine the light beams such that the polarization of the CW light received at input 102 is irrelevant.

As shown in FIG. 4, the PSR generates two light beams having the same polarization, $E_{in,U}$ 420 and $E_{in,L}$ 427, which are respectively similar to TE 120 and TE' 123. The solid arrows in FIG. 4 show the flow of two different portions of the light from $E_{in,U}$ 420, and the dashed arrows in FIG. 4 show the flow of different portions of the light from $E_{in,L}$ 427.

As shown by the solid arrows in FIG. 4, the $E_{in,U}$ 420 that is provided to the upper waveguide bus 205 is split into two portions. A first portion of $E_{in,U}$ 420 is passed to the micro ring 204, and is referred as $E_{r,U}$ 431 in FIG. 4. $E_{r,U}$ 431 continues along in clockwise direction, is modulated by the micro ring 204, and comes to the coupling region between micro ring 204 and the lower waveguide bus 206. A first portion of $E_{r,U}$ 431 is then provided to the lower waveguide bus 206 to form part of first drop signal $E_{d,U}$ 430 and reflected back to PSR 103 via the lower waveguide bus 206. For example, $E_{d,U}$ 430 may be the portion of light from $E_{in,U}$ 420 that is not necessary to be transmitted. $E_{d,U}$ 430 is defined by equation (6):

$$E_{d,U} = H_{drop} E_{in,U} \qquad (6)$$

where $E_{d,U}$ is the optical field for $E_{d,U}$ 430, $E_{in,U}$ is the optical field for $E_{in,U}$ 420, and $H_{drop}$ is defined by equation (3).

A second portion of $E_{in,U}$ 420 passes along the upper waveguide bus 205 to form part of the first pass signal $E_{p,U}$ 423. In the coupling region between micro ring 204 and lower waveguide bus 206, a second portion of $E_{r,U}$ 431 continues along the micro ring 204 based on the self-coupling coefficient t, is modulated by the micro ring 204, and comes again to the coupling region between micro ring 204 and the upper waveguide bus 205. The second portion of $E_{r,U}$ 431 then passes from the micro ring 204 to the upper waveguide bus 205 based on the cross-coupling coefficient k to form another part of the pass signal $E_{p,U}$ 423. As shown in FIG. 4, $E_{p,U}$ 423 is sent to PSR 108, which is configured to combine $E_{p,U}$ 423 with the pass signal from the lower waveguide bus 206 to generate a modulated output signal, which is labeled output 110 in FIG. 4. $E_{p,U}$ 423 is defined by equation (7):

$$E_{p,U} = H_{pass} E_{in,U} = H_{pass} E_{in} \sin\theta \qquad (7)$$

where $E_{p,U}$ is the optical field for $E_{p,U}$ 423, $E_{in}$ is the input 102, and $H_{pass}$ is defined by equation (5), $\theta$ is the input polarization orientation angle relative to the TE polarization of the first PSR 103, and $E_{in}$ is the input 102.

As shown by the dashed arrows in FIG. 4, the $E_{in,L}$ 427 that is provided to the lower waveguide bus 206 is also split into two portions. A first portion of $E_{in,L}$ 427 is passed to the micro ring 204, and is referred as $E_{r,L}$ 441. $E_{r,L}$ 441 continues along in a counter clockwise direction, is modulated by the micro ring 204, comes to the coupling region between micro ring 204 and the upper waveguide bus 205. A first portion of $E_{r,L}$ 441 is then provided to the upper waveguide bus 205 to form part of second drop signal $E_{d,L}$ 440 and reflected back to PSR 103 via the upper waveguide bus 205. For example, $E_{d,L}$ 440 may be the portion of light from $E_{in,L}$ 427 that is not necessary to be transmitted. $E_{d,L}$ 440 is defined by equation (8):

$$E_{d,L} = H_{drop} E_{in,L} \qquad (8)$$

where $E_{d,L}$ is the optical field for $E_{d,L}$ 440, $E_{in,L}$ is the optical field for $E_{in,L}$ 427, and $H_{drop}$ is defined by equation (3).

A second portion of $E_{in,L}$ 427 passes along the lower waveguide bus 206 to form part of the second pass signal $E_{p,L}$ 433. In the coupling region between the micro ring 204 and the upper waveguide bus 205, the second portion of $E_{r,L}$ 441 continues along the micro ring 204 based on the self-coupling coefficient t, is modulated by the micro ring 204, and comes again to the coupling region between micro ring 204 and lower waveguide bus 206. The second portion of $E_{r,L}$ 441 then passes from the micro ring 204 to the lower waveguide bus 206 based on the cross-coupling coefficient k to form another part of the pass signal $E_{p,L}$, 433. As shown in FIG. 4, $E_{p,L}$ 433 is sent to PSR 108, which is configured to combine $E_{p,U}$ 423 with the $E_{p,L}$ 433 to generate a modulated output signal, which is labeled output 110 in FIG. 4. $E_{p,L}$ 433 is defined by equation (9):

$$E_{p,L} = H_{pass} E_{in,L} = H_{pass} E_{in} \cos\theta \qquad (9)$$

where $E_{p,L}$ is the optical field for $E_{p,L}$ 433, and $H_{pass}$ is defined by equation (5), and $E_{in}$ is the input 102.

The output optical field of the PIMRM 400 is defined by equation (10):

$$\vec{E}_{out} \hat{e}_{TE} E_{p,L} + \hat{e}_{p,U} = H_{pass} E_{in} (\hat{e}_{TE} \cos\theta + \hat{e}_{TM} \sin\theta) \qquad (10)$$

where $\vec{E}_{out}$ is the PIMRM 400 output optical field, $\hat{e}_{TE}$ and $\hat{e}_{TE}$ are the unit vectors of TE and TM polarizations respectively, $\hat{e}_{TE} \cdot \hat{e}_{TE} = 1$, $\hat{e}_{TM} \cdot \hat{e}_{TM} = 1$, $\hat{e}_{TE} \cdot \hat{e}_{TM} = 0$, and the remainder of the variables are defined by equations (1) to (9). The total output power of PIMRM 400 is defined by equation (11):

$$P_{out} = |\vec{E}_{out}|^2 = |H_{pass} E_{in}|^2 (\cos^2\theta + \sin^2\theta) = |H_{pass} E_{in}|^2 \qquad (11)$$

where all variables are already defined above by equations (1) to (10). Equation (11) shows that the total output is independent to the polarization of input 102, or the incoming optical carrier, and that the CW light is modulated by electrical data via the micro ring resonator in the PIMRM 400.

Figure 5:
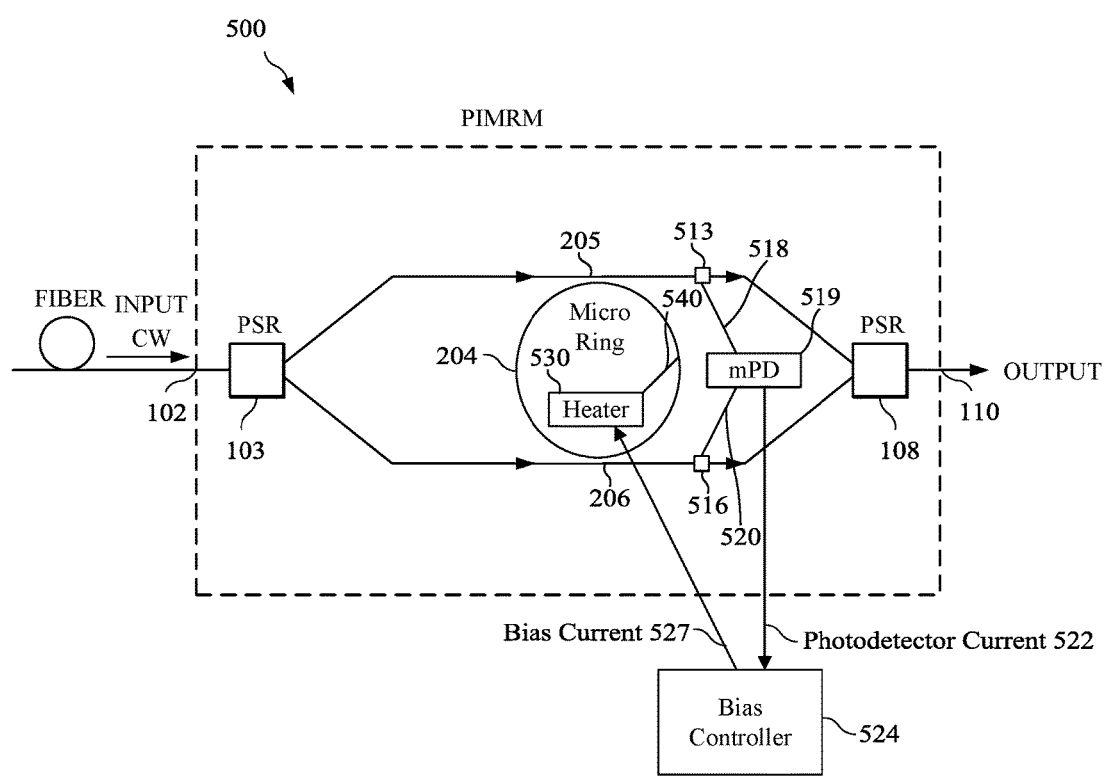
FIG. 5 is a schematic diagram of an embodiment of a PIMRM with bias control.

FIG. 5 is an embodiment of a PIMRM 500 with bias control. PIMRM 500 is similar to PIMRM 200 and 400, except that PIMRM 500 additionally includes a first tap 513, a second tap 516, a monitor photodetector (mPD) 519, a bias controller 524, and a heater 530. PIMRM 500 also includes an input 102, a first PSR 103, a micro ring 204, an upper waveguide bus 205, a lower waveguide bus 206, a second PSR 108, and an output 110. In an embodiment, the first tap 513 and the second tap 516 are each disposed on the part of the respective waveguide bus that carries the pass signal. For example, first tap 513 is disposed on the right hand side of the upper waveguide bus 205 and past the micro ring 204. Therefore, the light passing through the first pass 513 will be the first pass signal that has been modulated by the micro ring 204. Similarly, the second tap 516 is disposed on the right hand side of the lower waveguide bus 206 and past the micro ring 204. Therefore, the light passing through the second tap 516 will be the second pass signal that has been modulated by the micro ring 204.

In an embodiment, the first tap 513 and the second tap 516 are each optical couplers that are configured to couple out a small portion of light from the light beam being transmitted on the corresponding waveguide bus. The first tap 513 and the second tap 516 are also configured to transmit the small portion of the light to the mPD 519. For example, the first tap 513 is configured to couple out a small portion 518, such as about 1 percent (%) to 5%, of the light beam transmitted on the upper waveguide bus 205. The first tap 513 transmits the small portion 518 of the light beam transmitted on the upper waveguide bus 205 to the mPD 519. Similarly, the second tap 516 couples out a small portion 520 of the light beam transmitted on the lower waveguide bus 206 and transmits the small portion 520 of the light beam to the mPD 519. For example, the second tap 516 is configured to couple out a small portion 520, such as about 1% to 5%, of the light beam transmitted on the lower waveguide bus 206. As shown in FIG. 5, the small portion 518 of light from the first tap 513 enters the mPD 519 at a top end of the mPD 519, the small portion 520 of light from the second tap 516 enters the mPD 519 at the bottom end of the mPD 519. In an embodiment, opposite ends of the mPD 519 receive tapped and small portion of light from each waveguide bus of PIMRM 500. In an embodiment, the mPD 519 can receive the tapped small portion of light from each waveguide bus of PIMRM 500 in the same direction but at different active areas of the mPD 519.

In an embodiment, the mPD 519 is configured to perform photo-detection on both the small portion 518 of the light beam transmitted on the upper waveguide bus 205 and the small portion 520 of the light beam transmitted on the lower waveguide bus 206 to generate photodetector currents for both light beams. The mPD 519 is also configured to combine the photo currents for the small portion 518 of the light beam transmitted on the upper waveguide bus 205 and the small portion 520 of the light beam transmitted on the lower waveguide bus 206 to generate the photodetector current 522. The combined photodetector current 522 is independent of the polarization state of the input 102 from the incoming optical carrier. The combined photodetector current 522 is fed to the bias controller 524 that is configured to determine a bias current 527 based on the combined photodetector current 522.

The bias controller 524 may be a circuit comprising a processor and may generate the bias current 527 based on the combined photodetector current 522 and apply the bias current 527 to the heater 530. The heater 530 may be a resistor that changes temperature according to the bias current 527. The heater 530 is coupled to the micro ring 204 via the link 540 such that when the temperature of the heater 530 changes in response to an application of a bias current 527, the temperature of the micro ring 204 also changes. The changing of the temperature of the micro ring 204 controls the modulation of the light passing through the micro ring 204. The PIMRM 500 shown in FIG. 5 combines the tapped signals into a single mPD 519. However, multiple mPDs 519 can be used and the tapped signals can be combined electronically.

Figure 6:
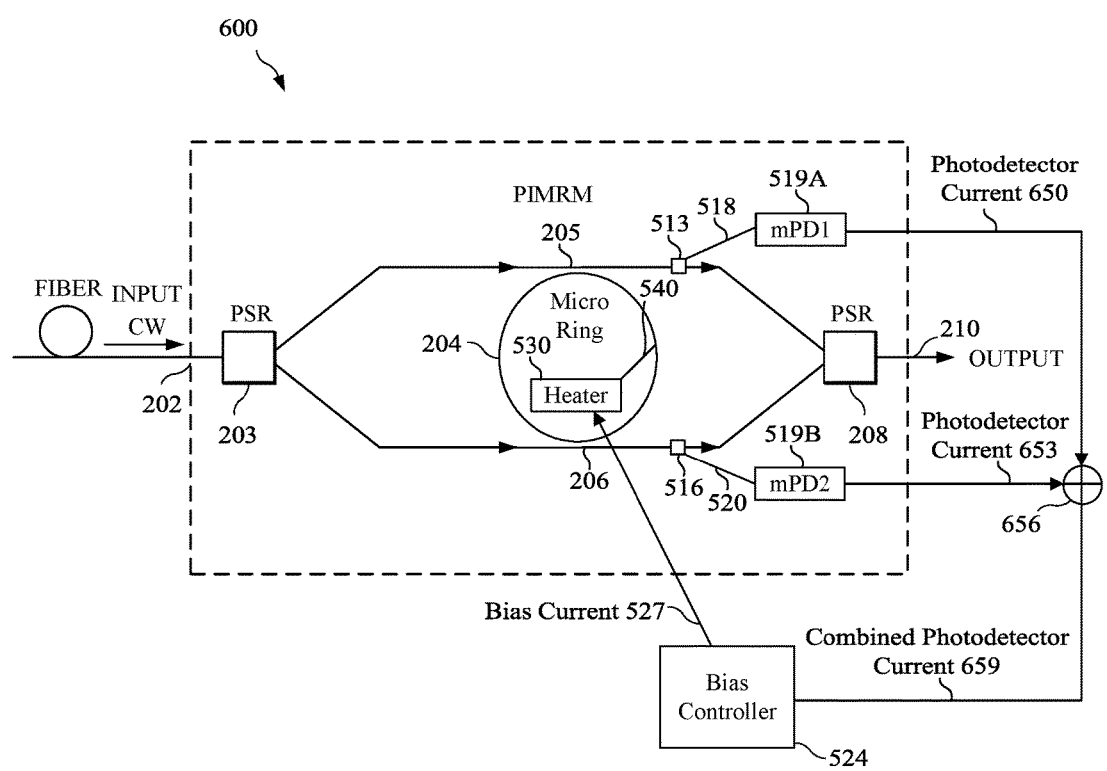
FIG. 6 is a schematic diagram of an embodiment of a PIMRM with bias control.

FIG. 6 is a schematic diagram of an embodiment of a PIMRM 600 with bias control using multiple mPDs. PIMRM 600 is similar to PIMRM 500, except that PIMRM 600 includes two mPDs 519A and 519B and a combiner 656. Similar to PIMRM 500, the first tap 513 and the second tap 516 of PIMRM 600 are each disposed on the part of the respective waveguide bus that carries the pass signal. The first tap 513 may couple out a small portion 518 of the light beam transmitted on the upper waveguide bus 205, such as about 1%-45% of the light beam transmitted on the upper waveguide bus 205. The first tap 513 may then transmit the small portion 518 of the light beam transmitted on the upper waveguide bus 205 to the first mPD 519A. Similarly, the second tap 516 may couple out a small portion 520 of the light beam transmitted on the lower waveguide bus 206 and transmit the small portion 520 of the light beam to the second mPD 519B.

The first mPD 519A and the second mPD 519B are configured to perform photo-detection on a received light beam. For example, the first mPD 519A performs photo-detection on the small portion 518 of the light beam transmitted on the upper waveguide bus 205, and the second mPD 519B performs photo-detection on the small portion 520 of the light beam transmitted on the lower waveguide bus 206. The first mPD 519A generates the photodetector current 650 based on the small portion 518 of the light beam transmitted on the upper waveguide bus 205. The second mPD 519B generates the photodetector current 653 based on the small portion 520 of the light beam transmitted on the lower waveguide bus 206. In an embodiment, the combiner 656 adds or combines the photodetector current 650 and the photodetector current 653 to generate the combined photodetector current 659. The combined photodetector current 659 is fed to the bias controller 524 that is configured to determine a bias current 527 based on the combined photodetector current 659. For example, a receiver of the bias controller 524 receives the combined photodetector current 659, and a processor calculates the bias current 527 based on the combined photodetector current 659.

The bias controller 524 may calculate the bias current 527 based on the combined photodetector current 659 and apply the bias current 527 to the heater 530. The heater 530 is coupled to the micro ring 204 via the link 540 such that when the temperature of the heater 530 changes in response to an application of a bias current 527, the temperature of the micro ring 204 also changes. The changing of the temperature of the micro ring 204 controls the modulation of the light passing through the micro ring 204.

Figure 7:
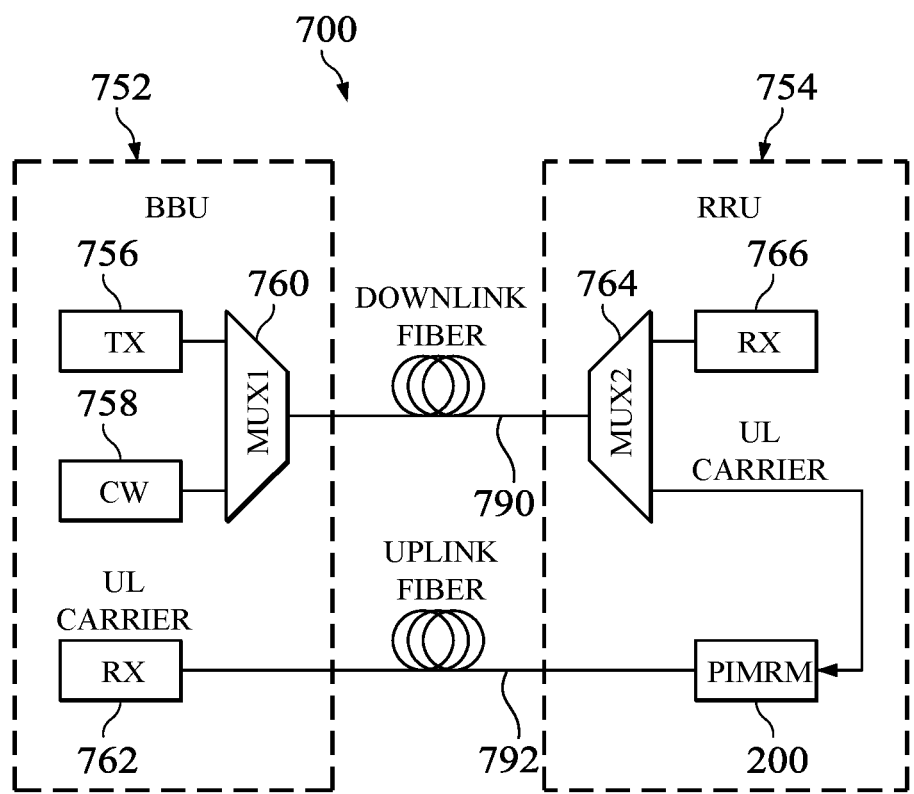
FIG. 7 is a schematic diagram of an embodiment of a PIMRM implemented in a front haul of a network.

FIG. 7 is a schematic diagram of an embodiment of a PIMRM, such as PIMRMs 200, 400, 500, and 600, implemented in a front haul of a network 700. The network 700 of FIG. 7 includes a BBU 752 coupled to a RRU 754 by way of optical fibers 790 and 792. The BBU 752 includes a downlink transmitter (TX) 756 and an uplink CW 758 feeding into a multiplexer 760 labeled MUX1. The BBU 752 also includes an uplink receiver (RX) 762.

The RRU 754 includes a demultiplexer 764 labeled MUX2 feeding into a downlink receiver (RX) 766 and the PIMRM 200. In an embodiment, one or both of the multiplexer 760 and the demultiplexer 764 is a WDM multiplexer. In an embodiment, one or both of the multiplexer 760 and the demultiplexer 764 is a coarse WDM multiplexer. In an embodiment, one or both of the multiplexer 760 and the demultiplexer 764 is in the form of a Mach-Zehnder (MZ) interferometer. The downlink optical fiber 790 couples the multiplexer 760 of the BBU 752 to the multiplexer 764 of the RRU 754. In addition, the uplink optical fiber 792 couples the PIMRM to the uplink RX 762.

In operation, the multiplexer 760 multiplexes the signal received from the downlink transmitter 756 and the CW light received from the uplink CW 758. In an embodiment, the signals have different wavelengths. For example, the downlink transmitter 756 uses downlink wavelength and the uplink CW 758 uses uplink wavelength. The multiplexer 760 transmits the multiplexed signal to the demultiplexer 764 via the downlink fiber 790.

The demultiplexer 764 demultiplexes the output signal to obtain the downlink wavelength and the uplink wavelength. The downlink wavelength is fed into the downlink receiver 766 and the uplink wavelength is fed into the PIMRM 200. The PIMRM 200 modulates the uplink wavelength with data and feeds the modulated output signal to the uplink receiver 762 using the uplink fiber 792.

Figure 8:
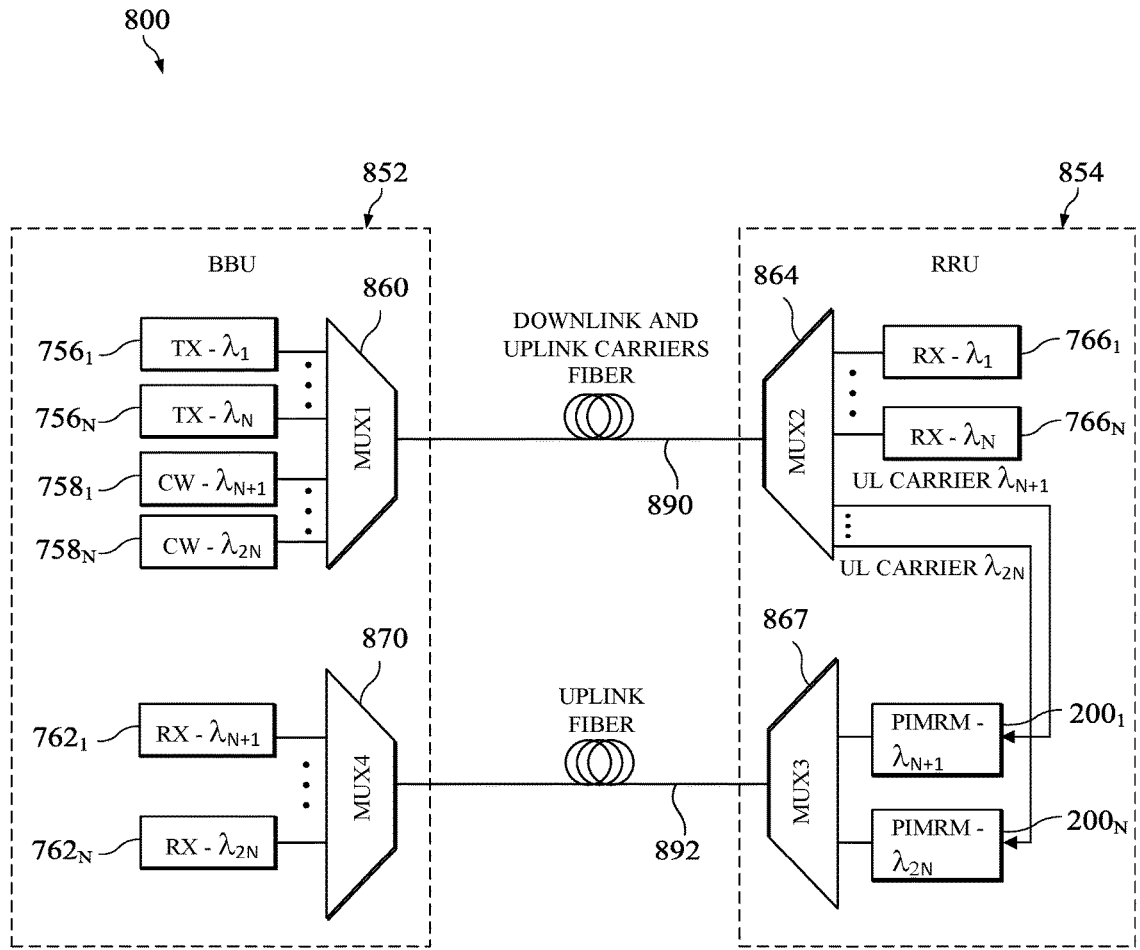
FIG. 8 is a schematic diagram of an embodiment of a PIMRM implemented in a front haul of a wireless network.

FIG. 8 is a schematic diagram of an embodiment of a plurality of PIMRMs, such as PIMRMs 200, 400, 500, and 600, implemented in a WDM wireless front haul network 800. The wireless front haul network 800 extends the embodiment of the PIMRM 200 implemented in the wireless front haul network 700 to a WDM case. The wireless network 800 of FIG. 8 includes a BBU 852 coupled to a RRU 854 by way of optical fibers 890 and 892. The BBU 852 includes N downlink TXs $756_{1-N}$, N uplink CWs $758_8$, a multiplexer (labelled MUX1) 860, N uplink RXs $762_{1-N}$, and a demultiplexer (labeled MUX4) 870. The RRU 854 includes a demultiplexer (labeled MUX2) 864, N downlink RXs $766_{1-N}$, N PIMRMs $200_{1-N}$, and a multiplexer (labeled MUX3) 867. N is a positive integer.

Each of the N downlink TXs $756_{1-N}$ operate on different frequencies ($\lambda$). As shown in FIG. 8, a first downlink TX $756_1$ transmits on $\lambda_1$, and an Nth downlink TX $756_N$ operates on $\lambda_N$. Each of the N uplink CWs $758_{1-N}$ also operate on different frequencies ($\lambda$). As shown in FIG. 8, a first uplink CW $758_1$ transmits on $\lambda_{N+1}$, and an Nth uplink CW $758_N$ operates on $\lambda_{2N}$. Although only two downlink TXs 756 and two uplink CWs 758 are shown in FIG. 8, it should be appreciated that any number (N) of downlink TXs 756 and uplink CWs 758 may be present in network 800. In an embodiment, one or more of the N downlink TXs $756_{1-N}$ may be generated by PIMRMs, such as PIMRM 200. In an embodiment, one or more of the N uplink CWs $758_{1-N}$ are used as UL carriers.

In an embodiment, each of the N downlink TXs $756_{1-N}$ and the N uplink CWs $758_{1-N}$ are fed into a multiplexer 860, which is labelled MUX1 in FIG. 8. In an embodiment, the multiplexer 860 is a 1×2N multiplexer. The multiplexer 860 multiplexes the N channel downlink signals and N uplink carriers to generate a multiplexed signal and sends the multiplexed signal to the demultiplexer 864 via the downlink fiber 890. The demultiplexer 864, labelled MUX2 in FIG. 8, is configured to receive the multiplexed signal. In an embodiment, the demultiplexer 864 is a 1×2N multiplexer. The demultiplexer 864 demultiplexes the multiplexed signal into the N channel downlink signals and N uplink carriers and feeds each of the demultiplexed signals to a corresponding one of the uplink RXs $866_{1-N}$ or N PIMRMs $200_{1-N}$. In an embodiment, each of the RXs $766_{1-N}$ detects and receives the corresponding downlink signal for a predefined frequency ($\lambda$). As shown in FIG. 8, downlink RX $766_1$ operates on $\lambda_1$ and receives the downlink signal for $\lambda_1$. Downlink RX $766_N$ operates on $\lambda_N$ and receives the downlink signal for $\lambda_N$.

In an embodiment, each of the PIMRMs $200_{1-N}$ receives the corresponding uplink carriers for a predefined frequency ($\lambda$). As shown in FIG. 8, PIMRM $200_1$ operates on $\lambda_{N+1}$ and receives the uplink carrier for $\lambda_{N+1}$. PIMRM $200_N$ operates on $\lambda_{2N}$ and receives the downlink signal for $\lambda_{2N}$. In an embodiment, each of the PIMRMs $200_{1-N}$ modulates one of the uplink carriers with data and feeds the modulated output signal to the multiplexer 867, which is labelled MUX3 in FIG. 8. In an embodiment, the multiplexer 867 is a 1×N multiplexer. The multiplexer 867 multiplexes each of the modulated output signals received from each of the PIMRMs $200_{1-N}$ to generate a multiplexed modulated output signal. The multiplexer 867 transmits the multiplexed modulated output signal via the uplink fiber 892 to the BBU 852. The demultiplexer 870 in the BBU 852 receives the multiplexed modulated output signal and demultiplexes the multiplexed modulated output signal into the separate modulated output signals. In an embodiment, the demultiplexer 870 is a 1×N multiplexer. The demultiplexer 870 feeds each of the separate modulated output signals to a corresponding one of the N uplink RXs $762_{1-N}$. As shown in FIG. 8, uplink RX $762_1$ operates on $\lambda_{N+1}$ and receives the modulated output signal for $\lambda_{N+1}$. Uplink RX $762_N$ operates on $\lambda_{2N}$ and receives the modulated output signal for $\lambda_{2N}$. Although only two uplink RXs $766_{1-N}$, two PIMRMs $200_1$ and $200_N$, and two uplink RXs $762_1$ and $762_N$ are shown in FIG. 8, it should be appreciated that any number (N) of downlink RXs $766_{1-N}$, PIMRMs $200_{1-N}$, and uplink RXs $862_{1-N}$ may be present in wireless front haul network 800.

Figure 9:
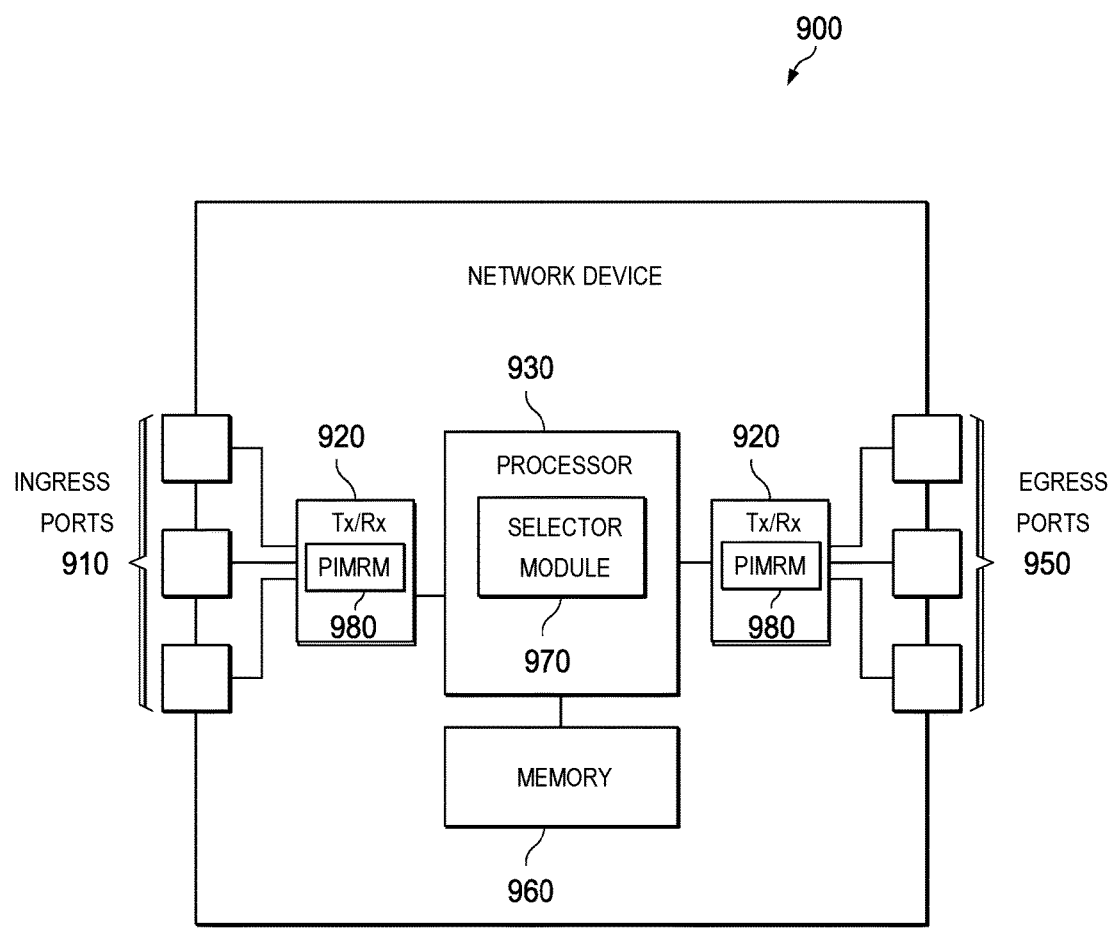
FIG. 9 is a schematic diagram of an embodiment of a plurality of PIMRMs implemented in a wavelength-division multiplexing (WDM) wireless front haul network.

FIG. 9 is a schematic diagram of a network element according to an embodiment of the disclosure. The network element 900 is suitable for implementing the components described herein (e.g., the PIMRMs, 200, 400, 500 and 600, or micro ring resonator 300). The network element 900 may be configured to implement or support any of the schemes, such as method 1000, described herein. In some embodiments, network element 900 may act as an RRU, BBU, EOR switch, TOR switch, rack server, or any other optical network element described herein. One skilled in the art will recognize that the term transceiver unit encompasses a broad range of devices of which network element 900 is merely an example. At least some of the features/methods described herein may be implemented by a network apparatus or component such as network element 900. For instance, the features/methods in the disclosure may be implemented using hardware, firmware, and/or software installed to run on hardware. The network element 900 may be any device that transports electrical, wireless, and/or optical signals through a network, e.g., a switch router, bridge, server, client, etc.

The network element 900 comprises ingress ports 910 for receiving data, transmitter/receiver units (Tx/Rx) 920 for transmitting/receiving data, a processor, logic unit, or central processing unit (CPU) 930 to process the data, egress ports 950 for transmitting the data, and a memory 860 for storing the data. The network element 900 may also comprise optical-to-electrical (OE) components and electrical-to-optical (EO) components coupled to the ingress ports 910, the receiver units 920, the transmitter units 920, and the egress ports 950 for egress or ingress of optical or electrical signals. In an embodiment, Tx/Rx 920 comprises the PIMRM module 980, configured to implement the functions of PIMRMs 200, 400, 500, and 600.

The processor 930 is implemented by hardware and software. The processor 930 may be implemented as one or more CPU chips, cores (e.g., as a multi-core processor), field-programmable gate arrays (FPGAs), application specific integrated circuits (ASICs), or digital signal processors (DSPs). The processor 930 is in communication with the ingress ports 910, Tx/Rx 920, egress ports 950, and memory 860. The processor 930 comprises a selector module 970. The selector module 970 implements the disclosed embodiments described above. For instance, the selector module 970 implements the modulation performed by PIMRMs 200, 400, 500, and 600 or the bias control performed by the bias controller 624. The inclusion of the selector module 970 therefore provides a substantial improvement to the functionality of the network element 900 and effects a transformation of the network element 900 to a different state. Alternatively, the selector module 970 is implemented as instructions stored in the memory 860 and executed by the processor 930.

The memory 860 comprises one or more disks, tape drives, and solid-state drives and may be used as an overflow data storage element, to store programs when such programs are selected for execution, and to store instructions and data that are read during program execution. The memory 860 may be volatile and non-volatile and may be read-only memory (ROM), random-access memory (RAM), ternary content-addressable memory (TCAM), or static random-access memory (SRAM).

The disclosed embodiments provide a PIMRM, which includes two PSRs, two optical waveguide buses, and a micro ring located between the two waveguide buses. The PIMRM receives an optical carrier from the first PSR, modulates the carrier at the micro ring resonator, and outputs the modulated light at the second PSR. The PIMRM is independent to and insensitive to the polarization orientation of the incoming optical carrier. The use of a micro ring resonator as the modulator for the PIMRM allows a high modulation speed. The micro ring itself has a small diameter of micrometers, and therefore the PIMRM will have a small footprint. In addition, the use of micro ring consumes low power, and therefore the PIMRM will also consume low power.

Figure 10:
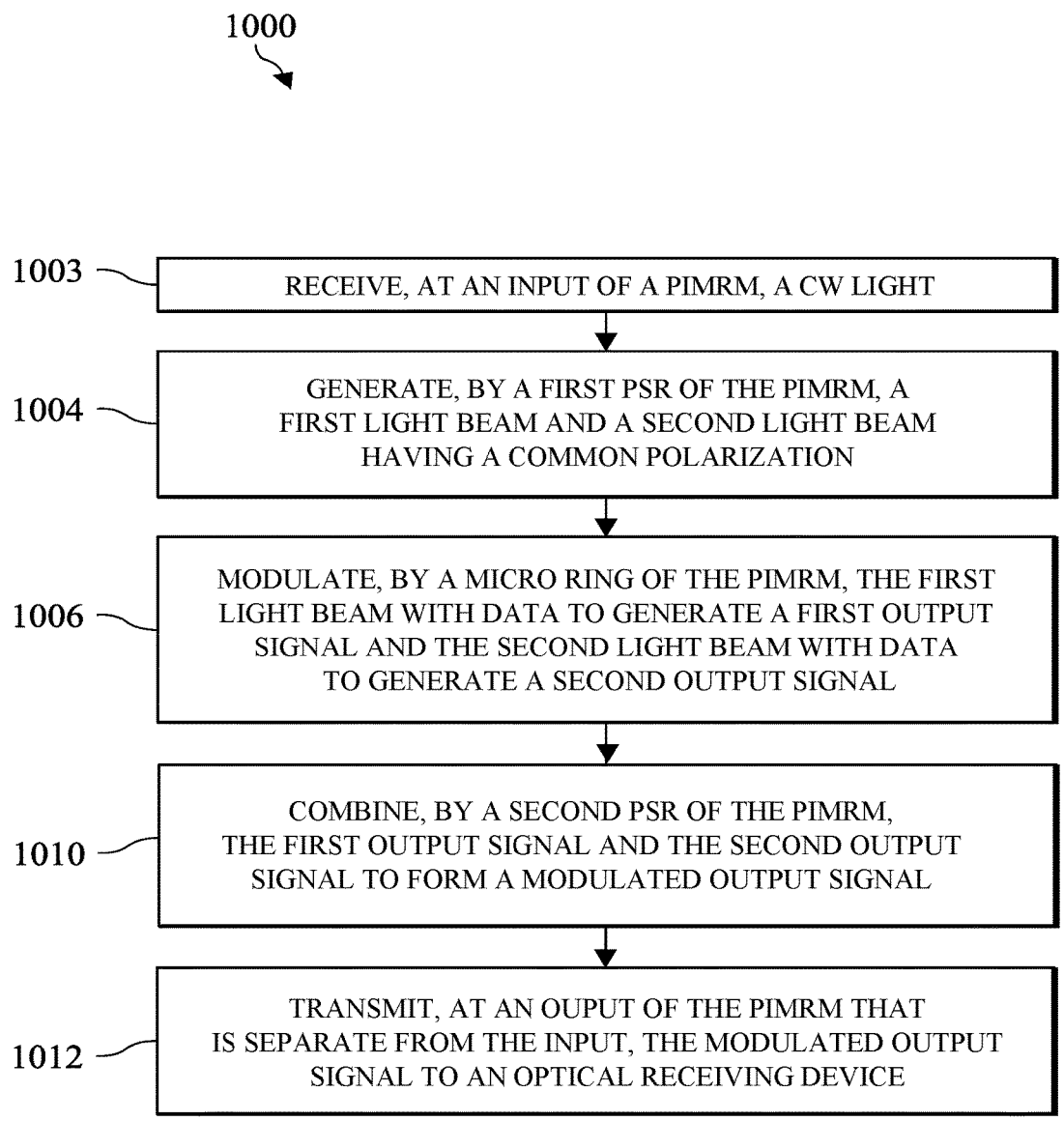
FIG. 10 is an embodiment of a method of modulation implemented by a PIMRM.

FIG. 10 is an embodiment of a method of modulation implemented by a PIMRM (e.g., the PIMRM 200, 400, 500, or 600). The method may be implemented when modulation of an optical signal is desired. In block 1003, a CW light is received at an input of the PIMRM. For example, the CW light is received at input 102. In block 1004, a first light beam and a second light beam having a common polarization is generated from the input. For example, PSR 103 generates a first light beam and a second light beam having a common polarization. PSR 103 is configured to split the CW light into a first light beam having a TE polarization and a third light beam having a TM polarization. The first PSR 103 is configured to rotate the third light beam having the TM polarization to generate the second light beam having the TE polarization. The first light beam and the second light beam have a common polarization, TE polarization.

In block 1006, the first light beam is modulated with data to generate a first output signal and the second light beam is modulated with data to generate a second output signal. For example, micro ring 204 modulates the first light beam with data to generate a first output signal and the second light beam with data to generate a second output signal. In block 1010, the first output signal and the second output signal are combined to form a modulated output signal. For example, the second PSR 108 combines the first output signal and the second output signal to form a modulated output signal. In block 1012, the modulated output signal is transmitted to an optical receiving device at an output separate from the input. For example, an output 110 that is separate from the input 102 transmits the modulated output signal to an optical receiving device.

In an embodiment, the disclosure includes an apparatus implemented as a transmission-type polarization insensitive modulator, comprising a means for receiving a CW light, a means for generating a first light beam and a second light beam having a common polarization from the input, a means for modulating the first light beam with data to generate a first output signal, a means for modulating the second light beam with data to generate a second output signal, a means for combining the first output signal and the second output signal to form a modulated output signal, and a means for outputting the modulated output signal to an optical receiving device.

In an embodiment, the disclosure includes transmission-type modulator comprising a means for generating a first light beam and a second light beam having a common polarization from an CW light, a means for modulating the first light beam with data to generate a first output signal, a means for modulating the second light beam with data to generate a second output signal, and a means for combining the first output signal and the second output signal to form a modulated output signal, wherein the micro ring is disposed in between the first PSR and the second PSR.

In an embodiment, the disclosure includes a method of modulation implemented by PIMRM, comprising a means for receiving a CW light, a means for generating a first light beam and a second light beam having a common polarization from the input, a means for modulating the first light beam with data to generate a first output signal and the second light beam with data to generate a second output signal, a means for combining the first output signal and the second output signal to form a modulated output signal, and a means for transmitting the modulated output signal to an optical receiving device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A transmission-type polarization insensitive modulator, comprising:
    an input configured to receive a continuous wave (CW) light;
    a first polarization splitter-rotator (PSR) coupled to the input and configured to generate a first light beam and a second light beam having a common polarization from the CW light;
    an upper waveguide bus coupled to the first PSR and comprising a first tap;
    a lower waveguide bus coupled to the first PSR and comprising a second tap;
    a micro ring optically coupled to the upper waveguide bus and the lower waveguide bus, and configured to:
        modulate the first light beam with data to generate a first drop signal and a first pass signal, both the first drop signal and the first pass signal having a same wavelength, the first drop signal being transmitted around the micro ring and to the lower waveguide bus, the first pass signal being transmitted along the upper waveguide bus; and
        modulate the second light beam with data to generate a second drop signal and a second pass signal, both the second drop signal and the second pass signal having a same wavelength, the second drop signal being transmitted around the micro ring and to the upper waveguide bus, the second pass signal being transmitted along the lower waveguide bus;
    the first tap configured to couple out a first portion of the first pass signal to send to a monitor photodetector,
    the second tap configured to couple out a second portion of the second pass signal to send to the monitor photodetector, and
    the monitor photodetector configured to:
        generate a first photodetector current based on the first portion of the first pass signal;
        generate a second photodetector current based on the second portion of the second pass signal;
        sum the first photodetector current and the second photodetector current; and
        adjust a temperature of the micro ring,
    a second PSR coupled to the upper waveguide bus and the lower waveguide bus and configured to combine the first pass signal and the second pass signal to form a modulated output signal,
        the first tap disposed on the upper waveguide bus between the micro ring and the second PSR, and
        the second tap disposed on the lower waveguide bus between the micro ring and the second PSR; and
    an output coupled to the second PSR and configured to output the modulated output signal to an optical receiving device.

2. The modulator of claim 1, wherein the first PSR is further configured to:
    split the CW light into the first light beam having a transverse electric (TE) polarization and a third light beam having a transverse magnetic (TM) polarization; and
    rotate the third light beam having the TM polarization to generate the second light beam having the TE polarization.

3. The modulator of claim 1, wherein the monitor photodetector is further configured to sum the first photodetector current based on the first portion of the first pass signal and the second photodetector current based on the second portion of the second pass signal to generate a combined photodetector current, wherein the modulator further comprises:
    a heater coupled to the micro ring; and
    a bias controller coupled to the monitor photodetector and configured to:
        generate a bias current based on the combined photodetector current; and
        apply the bias current to the heater such that the temperature of the heater is changed according to the bias current, wherein the temperature of micro ring changes according to the temperature of the heater.

4. The modulator of claim 3, wherein the first portion is about 1-5 percent (%) of the first pass signal, and wherein the second portion is about 1-5% of the second pass signal.

5. The modulator of claim 1, wherein the first portion of the first pass signal and the second portion of the second pass signal are input into the monitor photodetector from opposite ends.

6. The modulator of claim 1, wherein the first portion of the first pass signal and the second portion of the second pass signal are input into the monitor photodetector from the same direction but at different active areas of the monitor photodetector.

7. The modulator of claim 1, further comprising:
    a heater coupled to the micro ring;
    a first monitor photodetector coupled to the first tap and configured to receive the first portion of the first pass signal and generate a first photodetector current based on the first portion of the first pass signal;
    a second monitor photodetector coupled to the second tap and configured to receive the second portion of the second pass signal and generate a second photodetector current based on the second portion of the second pass signal;

a combiner coupled to a first monitor photodetector and a second monitor photodetector, and configured to sum the first photodetector current and the second photodetector current, and a bias controller coupled to the combiner and configured to:
generate a bias current based on the combined first photodetector current and the second photodetector current; and
apply the bias current to the heater such that the temperature of the heater is changed according to the bias current, wherein the temperature of the micro ring changes according to the temperature of the heater.

8. A transmission-type modulator, comprising:
a first polarization splitter-rotator (PSR) configured to generate a first light beam and a second light beam having a common polarization from an input;
a micro ring resonator configured to:
modulate the first light beam with data to generate a first drop signal and a first pass signal, both the first drop signal and the first pass signal having a same wavelength, the first drop signal being transmitted around the micro ring and to a lower waveguide bus, the first pass signal being transmitted along an upper waveguide bus; and
modulate the second light beam with data to generate a second drop signal and a second pass signal, both the second drop signal and the second pass signal having a same wavelength, the second drop signal being transmitted around the micro ring and to the upper waveguide bus, the second pass signal being transmitted along the lower waveguide bus; and
a second PSR configured to combine the first pass signal and the second pass signal to form a modulated output signal, wherein the micro ring is disposed in between the first PSR and the second PSR, the upper waveguide bus comprising a first tap disposed between the micro ring and the second PSR and configured to couple out a first portion of the first pass signal to send to a monitor photodetector, the lower waveguide bus comprising a second tap disposed between the micro ring and the second PSR and configured to couple out a second portion of the second pass signal to send to the monitor photodetector, the monitor photodetector being configured to generate a first photodetector current based on the first portion of the first pass signal and a second photodetector current based on the second portion of the second pass signal, sum the first photodetector current and the second photodetector current, and adjust a temperature of the micro ring.

9. The transmission-type modulator of claim 8, further comprising the upper waveguide bus and the lower waveguide bus, wherein a top portion of the micro ring is optically coupled to the upper waveguide bus, and wherein a bottom portion of the micro ring is optically coupled to the lower waveguide bus.

10. The transmission-type modulator of claim 8, wherein the first modulated drop signal passes through the micro ring and back to the first PSR, wherein the first drop signal passes through the micro ring and back to the first PSR, and wherein the second drop signal passes through the micro ring and back to the first PSR.

11. The transmission-type modulator of claim 8, wherein an amplitude transfer function of the first pass signal and the second pass signal is defined by the equation $$H_{pass} = \frac{E_{pass}}{E_{input}} = \frac{t - tae^{j\phi}}{1 - t^2 ae^{j\phi}},$$

wherein $E_{pass}$ is an optical field for the first pass signal or the second pass signal, e is a natural exponential function, $\phi$ is a single-pass phase shift, k is a predefined cross-coupling coefficient, t is a predefined self-coupling coefficient, a is a single pass amplitude transmission, and j is a unit imaginary number where $j^2$ equals −1.

12. The transmission-type modulator of claim 8, further comprising a processor coupled to a heater and configured to apply a bias current to the heater, wherein the heater is coupled to the micro ring.

13. The transmission-type modulator of claim 12, wherein the bias current is determined based on a photodetector current of the first pass signal and the second pass signal.

14. A method of modulation implemented by a polarization insensitive micro ring modulator (PIMRM), comprising:
receiving, at an input of the PIMRM, a continuous wave (CW) light;
generating, by a first polarization splitter-rotator (PSR) of the PIMRM, a first light beam and a second light beam having a common polarization from the CW light;
modulating, using a micro ring of the PIMRM, the first light beam with data to generate a first drop signal and a first pass signal, both the first drop signal and the first pass signal having the same wavelength, the first drop signal being transmitted around the micro ring and to a lower waveguide bus, the first pass signal being transmitted along an upper waveguide;
modulating, using the micro ring, the second light beam to generate a second drop signal and a second pass signal, both the second drop signal and the second pass signal having a same wavelength, the second drop signal being transmitted around the micro ring and to the upper waveguide bus, the second pass signal being transmitted along the lower waveguide bus;
coupling out, by a first tap disposed on the upper waveguide bus between the micro ring and a second PSR, a first portion of the first pass signal to send to a monitor photodetector;
coupling out, by a second tap disposed on the lower waveguide bus between the micro ring and the second PSR, a second portion of the second pass signal to send to the monitor photodetector, the monitor photodetector being configured to generate a first photodetector current based on the first portion of the first pass signal and a second photodetector current based on the second portion of the second pass signal, sum the first photodetector current and the second photodetector current, and adjust a temperature of the micro ring;
combining, by the second PSR of the PIMRM, the first pass signal and the second pass signal to form a modulated output signal; and
transmitting, at an output of the PIMRM that is separate from the input, the modulated output signal to an optical receiving device.

15. The method of claim 14, wherein generating, by the first PSR, the first light beam and the second light beam having the common polarization comprises:
splitting, by the first PSR, the CW light into the first light beam having a transverse electric (TE) polarization and a third light beam having a transverse magnetic (TM) polarization; and rotating, by the first PSR, the third light beam having the TM polarization to generate the second light beam having the TE polarization.

16. The method of claim 14, further comprising:
providing, by the first PSR, the first light beam to the upper waveguide bus of the PIMRM; and
providing, by the first PSR, the second light beam to the lower waveguide bus of the PIMRM, wherein the micro ring is disposed in between the upper waveguide bus and the lower waveguide bus, and wherein the micro ring is optically coupled to the upper waveguide bus, and wherein the micro ring is optically coupled to the lower waveguide bus.

17. The method of claim 14, wherein the micro ring is disposed in between the first PSR and the second PSR.

18. The method of claim 14, wherein the first drop signal travels around the micro ring and passes to a lower waveguide bus such that the first drop signal is reflected back to the first PSR.

19. The method of claim 14, wherein the second drop signal travels around the micro ring and passes to an upper waveguide bus such that the second drop signal is reflected back to the first PSR.

20. The method of claim 14, further comprising controlling, by a processor operably coupled to the micro ring via a heater, a bias current of the heater, wherein controlling the bias current controls a temperature of the micro ring.

* * * * *